United States Patent
Hiromoto

(10) Patent No.: US 11,769,340 B2
(45) Date of Patent: Sep. 26, 2023

(54) INFORMATION PROCESSING APPARATUS AND METHOD OF INFERRING

(71) Applicant: FUJITSU LIMITED, Kawasaki (JP)

(72) Inventor: Masayuki Hiromoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 17/392,296

(22) Filed: Aug. 3, 2021

(65) Prior Publication Data

US 2022/0156535 A1    May 19, 2022

(30) Foreign Application Priority Data

Nov. 16, 2020 (JP) ................................ 2020-190388

(51) Int. Cl.
*G06V 30/262* (2022.01)
*G06N 3/08* (2023.01)
(Continued)

(52) U.S. Cl.
CPC ........ *G06V 30/274* (2022.01); *G06F 18/2431* (2023.01); *G06N 3/08* (2013.01); *G06N 5/04* (2013.01)

(58) Field of Classification Search
CPC .. G06V 30/274; G06V 10/761; G06V 10/768; G06V 10/7715; G06V 10/806;
(Continued)

(56) References Cited

U.S. PATENT DOCUMENTS 7,251,637 B1    7/2007 Caid et al.
2019/0236167 A1    8/2019 Hu et al.
(Continued)

FOREIGN PATENT DOCUMENTS

JP    2017-162009 A    9/2017
JP    2020-004322 A    1/2020

OTHER PUBLICATIONS

Pentti Kanerva, "Hyperdimensional Computing: An Introduction to Computing in Distributed Representation with High-Dimensional Random Vectors", Cognitive Computation, vol. 1, No. 2, pp. 139-159, 2009, Published online: Jan. 28, 2009, Springer Science+Business Media, LLC 2009 (Total 21 pages).

*Primary Examiner* — Helen Zong
(74) *Attorney, Agent, or Firm* — Fujitsu Patent Center

(57) ABSTRACT

A non-transitory computer-readable recording medium stores a program for causing a computer to execute a process including for each of plural pieces of first-type training data including image information, first semantic information, and a first class of a relevant first object, generating a first hyperdimensional vector (HV) from the image information and the first semantic information, and storing the first HV in a storage unit in correlation with the first class, and for each of plural pieces of second-type training data including second semantic information and a second class of a relevant second object, obtaining, from the storage unit, a predetermined number of HVs exhibiting a higher degree of matching with an HV generated from the second semantic information, generating a second HV of the second-type training data based on the predetermined number of HVs, and storing the second HV in the storage unit in correlation with the second class.

6 Claims, 13 Drawing Sheets

(51) Int. Cl.
*G06N 5/04* (2023.01)
*G06F 18/2431* (2023.01)

(58) Field of Classification Search
CPC .. G06V 40/10; G06V 10/454; G06F 18/2431; G06F 18/213; G06F 18/22; G06F 18/24147; G06F 18/2155; G06N 3/08; G06N 5/04; G06N 3/045; G06N 5/041
See application file for complete search history.

(56) References Cited

U.S. PATENT DOCUMENTS

2020/0380027 A1* 12/2020 Aggarwal ............. G06F 16/538
2023/0087526 A1* 3/2023 Huang ................. G06V 10/774

* cited by examiner

10000 BITS

FIG. 13
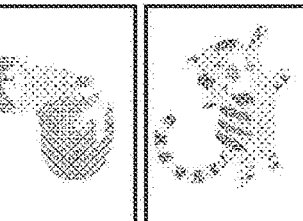
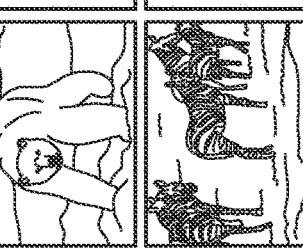
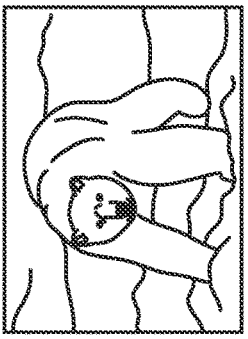
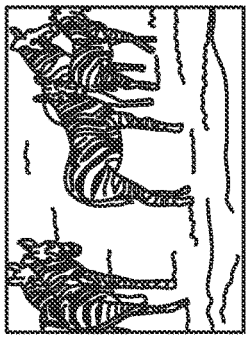
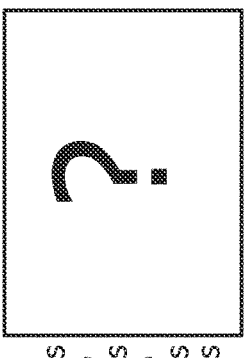
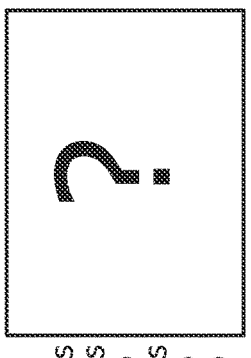
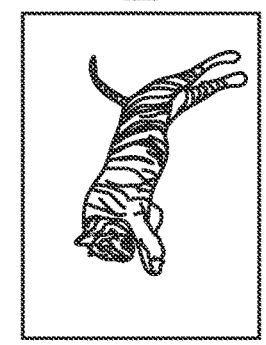
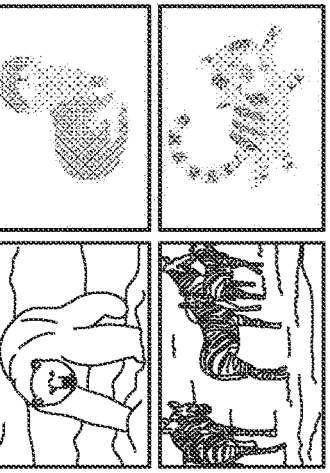
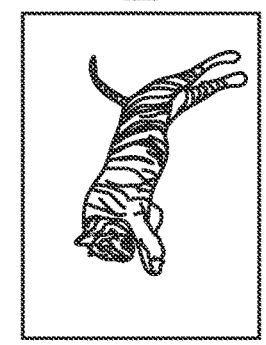

INFORMATION PROCESSING APPARATUS AND METHOD OF INFERRING

CROSS-REFERENCE TO RELATED APPLICATION

This application is based upon and claims the benefit of priority of the prior Japanese Patent Application No. 2020-190388, filed on Nov. 16, 2020, the entire contents of which are incorporated herein by reference.

FIELD

The embodiment discussed herein is related to an information processing apparatus and a method of inferring.

BACKGROUND

Today, neural networks (NNs) are actively used in image recognition and other fields. For example, the accuracy of image recognition is significantly improved by using deep learning (DL).

However, in recognition using the DL, only an object to which training data is given is able to be recognized. In contrast, humans are able to recognize even an image that they have not actually seen when other clue information is given. As a technique that realizes such human recognition, there is zero-shot learning (ZSL). The zero-shot learning enables, by giving clue information, recognition without training data.

FIGS. 12A and 12B are diagrams for explaining the zero-shot learning. FIG. 12A illustrates training in the zero-shot learning, and FIG. 12B illustrates inference in the zero-shot learning. As illustrated in FIG. 12A, there are two types of data in the training data.

First-type training data includes a class, image information, and semantic information. The semantic information is clue information for recognition. For example, "zebra" is related to "quadrapedal", "stripes", and "eats vegetation" as the semantic information, and "lion" is related to "quadrapedal", "brown", and "eats meat" as the semantic information. "Quadrapedal", "stripes", "eats vegetation", "brown", "eats meat" and so forth indicate attributes of objects to be recognized.

Second-type training data includes a class and semantic information and does not include image information. For example, "tiger" is related to "quadrapedal", "stripes", "brown", and "eats meat" as the semantic information, but there is no image information related to the "tiger".

As illustrated in FIG. 12B, when image information of "tiger" is given and asked "what is this animal?", the inference apparatus provides an answer of "tiger" as an inference result. Although the image information of "tiger" is not given in the training, the inference apparatus outputs "tiger" as an answer using the semantic information as a clue.

As the related art, there is a features generation apparatus that accurately and efficiently finds semantically similar or the same items of content. This features generation apparatus generates and outputs an integrated feature vector when one or more initial feature vectors representing content of an object of features generation are input. For example, the features generation apparatus assigns each of the initial feature vectors to one or more quanta based on a quantizer defined by a plurality of predetermined quanta and representative vectors respectively corresponding to the plurality of predetermined quanta. The features generation apparatus obtains, for each quantum, a residual vector of the initial feature vector assigned to the quantum and the representative vector corresponding to the quantum. The features generation apparatus obtains an integrated feature vector by integrating the residual vectors calculated for the respective quanta, and outputs, as the features of the content, an integrated feature vector obtained by performing decorrelation processing by applying a predetermined transformation matrix to the obtained integrated feature vector.

As the related art, there is a system that performs search based on a query image. This system generates a set of visual words representing a query image from features extracted from the query image and compares the set of visual words with visual words of index images. The system generates, from the index images, a set of candidate images that match one or more visual words in the comparison. Then, the system performs multi-level ranking to sort the set of candidate images, and returns a result of the multi-level ranking to a user device that has provided the query image.

As the related art, there also exists a text similarity calculation apparatus that accurately calculates a similarity between texts. This text similarity calculation apparatus calculates an image similarity that is a similarity between first image information which corresponds to a first text and is obtained by converting the first text and second image information which corresponds to a second text and is obtained by converting the second text. The text similarity calculation apparatus calculates a text vector similarity that is a similarity between a first text vector representing the first text and a second text vector representing the second text. The text similarity calculation apparatus calculates a similarity between the first text and the second text based on the image similarity and the text vector similarity.

Also, as the related art, there is hyperdimensional computing (HDC) that is one of non-von Neumann computing techniques focusing on information expression in the brain.

Japanese Laid-open Patent Publication No. 2017-162009, U.S. Patent Application Publication No. 2019/0236167, and Japanese Laid-open Patent Publication No. 2020-4322 are disclosed as related art.

Kanerva, P, "Hyperdimensional Computing: An Introduction to Computing in Distributed Representation with High-Dimensional Random Vectors", Cognitive Computation, vol. 1, no. 2, pp. 139-159, 2009 is also disclosed as related art.

SUMMARY

According to an aspect of the embodiment, a non transitory computer-readable recording medium stores an inference program for causing a computer to execute a process, the process including for each of plural pieces of first-type training data of first objects to be learned, the first-type training data including first image information, first semantic information, and a first class of a relevant first object, generating a first image hyperdimensional vector (HV) from the first image information, generating a first semantic HV from the first semantic information, generating a first integrated HV by integrating the first image HV and the first semantic HV, and storing the first integrated HV in a storage unit in correlation with the first class, and for each of plural pieces of second-type training data of second objects to be learned, the second-type training data including second semantic information and a second class of a relevant second object and not including image information of the relevant second object, generating a second semantic HV from the second semantic information, searching in the storage unit based on the second semantic HV, obtaining, from the storage unit, a predetermined number of integrated HVs selected from an integrated HV exhibiting a highest degree of matching with the second semantic HV, generating a second integrated HV of the second-type training data based on the predetermined number of integrated HVs, and storing the second integrated HV in the storage unit in correlation with the second class.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram for explaining training and inference in the zero-shot learning.

DESCRIPTION OF EMBODIMENT

Figure 1A:
FIGS. 1A and 1B are diagrams for explaining a hyperdimensional vector (HV)

In the zero-shot learning, the inference apparatus constructs images insufficient in the second-type training data based on the first-type training data and the semantic information included in the second-type training data and adds the constructed images to knowledge data. Upon receiving the query image, the inference apparatus searches for an image closest to the query image from images including the constructed images and outputs the class of the query image as an answer.

FIG. 13 is a diagram for explaining training and inference in the zero-shot learning. As illustrated in FIG. 13, in training, image information and semantic information of a polar bear and a zebra are given as the first-type training data. The semantic information of the polar bear includes that the colors of the polar bear do not include black (black: no), the colors of the polar bear include white (white: yes), the colors of the polar bear include brown (brown: yes), the polar bear does not appear striped (stripes: no), the polar bear is an aquatic animal (water: yes), and the polar bear eats fish (eats fish: yes). The semantic information of the zebra includes that the colors of the zebra include black (black: yes), the colors of the zebra include white (white: yes), the colors of the zebra do not include brown (brown: no), the zebra appears striped (stripes: yes), the zebra is not an aquatic animal (water: no), and the zebra does not eat fish (eats fish: no).

Semantic information of an otter and a tiger is given as the second-type training data. The semantic information of the otter includes that the colors of the otter include black (black: yes), the colors of the otter do not include white (white: no), the colors of the otter include brown (brown: yes), the otter does not appear striped (stripes: no), the otter is an aquatic animal (water: yes), and the otter eats fish (eats fish: yes). The semantic information of the tiger includes that the colors of the tiger include black (black: yes), the colors of the tiger include white (white; yes), the colors of the tiger do not include brown (brown: no), the tiger appears striped (stripes: yes), the tiger is not an aquatic animal (water: no), and the tiger does not eat fish (eats fish: no).

A constructed image of the otter is generated from the image information and the semantic information of the polar bear and the zebra and the semantic information of the otter. A constructed image of the tiger is generated from the image information and the semantic information of the polar bear and the zebra and the semantic information of the tiger.

In the inference, when an image of tiger is given as a query, matching with the images, including the constructed images, of polar bear, zebra, otter, and tiger is performed, an image of the tiger is retrieved as the most similar image, and the tiger is output as an answer.

In the zero-shot learning of related art, generation models based on neural networks such as generative adversarial networks (GAN) are mainly used to generate constructed images. However, there is a problem in that the generation of constructed images takes time. The GAN is one of methods of "unsupervised learning" in which features are learned without providing correct data. The generation model is formed by modeling a probability distribution itself that generates currently observable data based on a thought that "the currently observable data is supposed to be generated based on some probability distribution".

Hereinafter, an embodiment of the present application is described in detail with reference to the drawings. The embodiment does not limit the disclosed techniques.

Embodiment

Figure 1B:
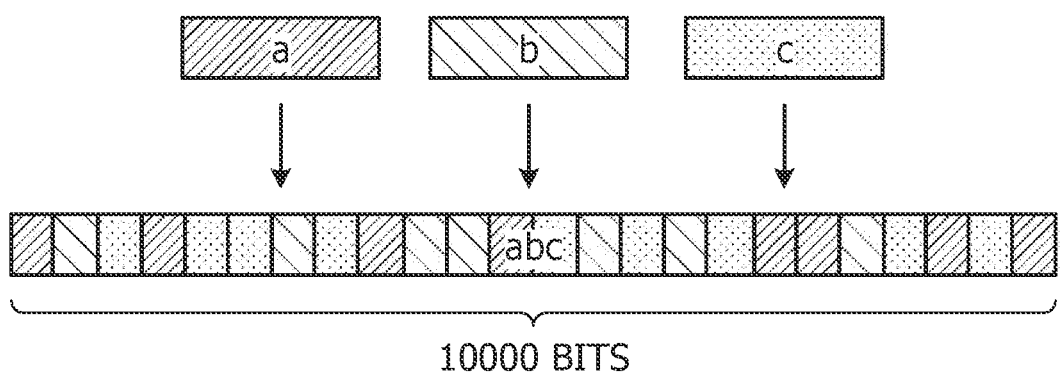

First, hyperdimensional computing (HDC) will be described. In the HDC, a hyperdimensional vector (HV) is used for data representation. FIGS. 1A and 1B are diagrams for explaining the HV. In the HV, data is represented in a distributed manner by a hyperdimensional vector of 10000 or larger dimensions. In the HV, various types of data are represented by vectors having the same bit length.

As illustrated in FIG. 1A, in a normal data representation, pieces of data such as a, b, c are collectively represented on a piece-by-piece basis. In contrast, as illustrated in FIG. 1B, in the hyperdimensional vector, pieces of data such as a, b, c are represented in a distributed manner. In the HDC, data is able to be manipulated by simple operation such as addition and multiplication. Also in the HDC, relationships between pieces of data are able to be represented in addition or multiplication.

Figure 2:
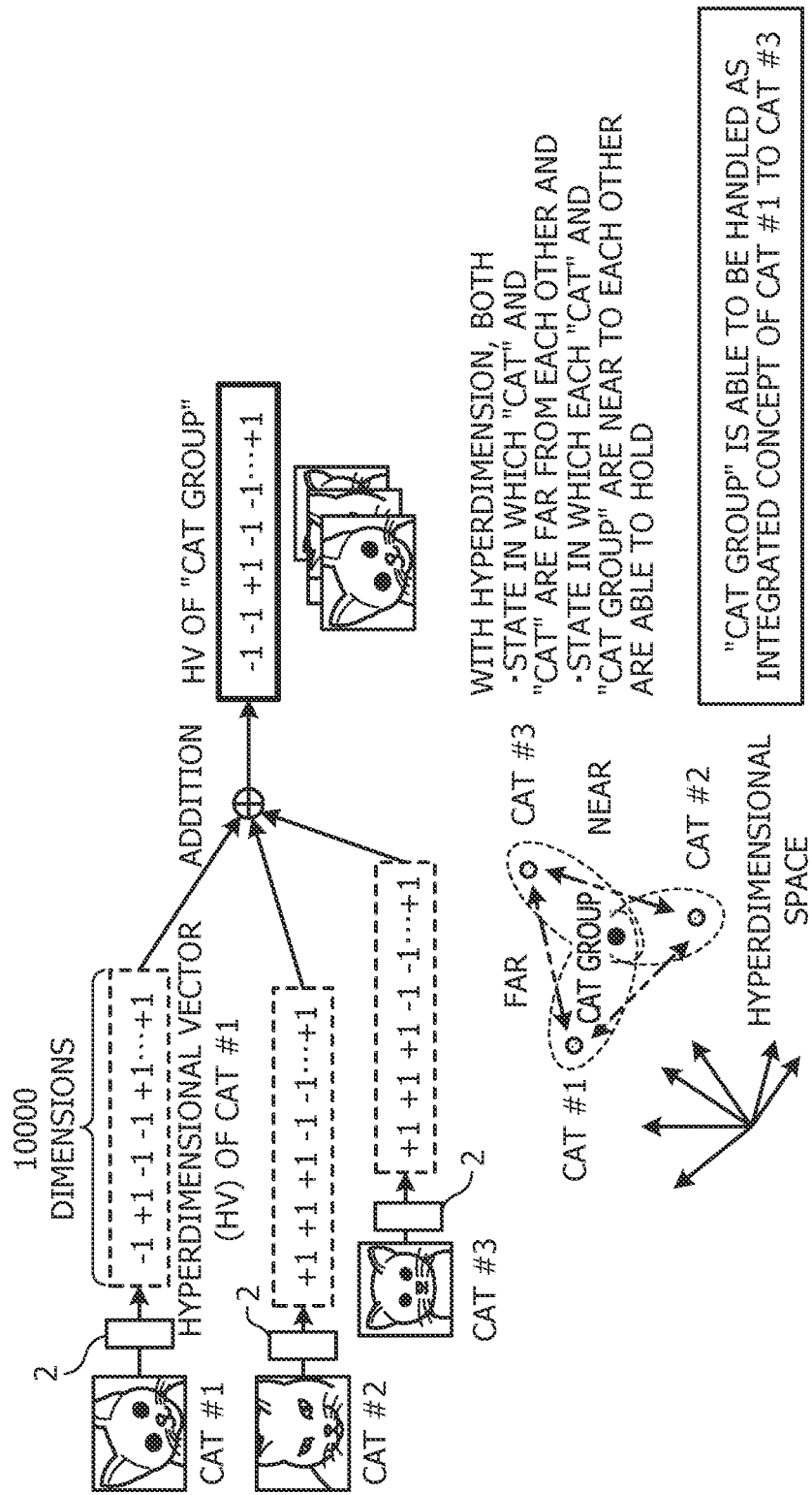
FIG. 2 illustrates a representation example of a set obtained by addition.

FIG. 2 illustrates a representation example of a set obtained by addition. In FIG. 2, HV encoders 2 generate an HV of a cat #1, an HV of a cat #2, and an HV of a cat #3 respectively from an image of the cat #1, an image of the cat #2, and an image of the cat #3. Individual elements of the HVs are "+1" or "−1". Cats #1 to #3 are each represented by 10000 dimensional HV.

As illustrated in FIG. 2, an HV obtained by adding the HVs of the cat #1, cat #2, and the cat #3 represents a set including the cat #1, the cat #2, and the cat #3, for example, a "cat group". The addition of the HVs is addition performed on an element-by-element basis. When an addition result is positive, the addition result is substituted with "+1". When the addition result is negative, the addition result is substituted with "−1". When the addition result is "0", the addition result is substituted with "+1" or "−1" under a predetermined rule. In the HDC, a state in which "cats" are far from each other and a state in which each "cat" and the "cat group" are near to each other may coexist. In the HDC, the "cat group" is able to be handled as an integrated concept of cat #1 to cat #3.

Figure 3:
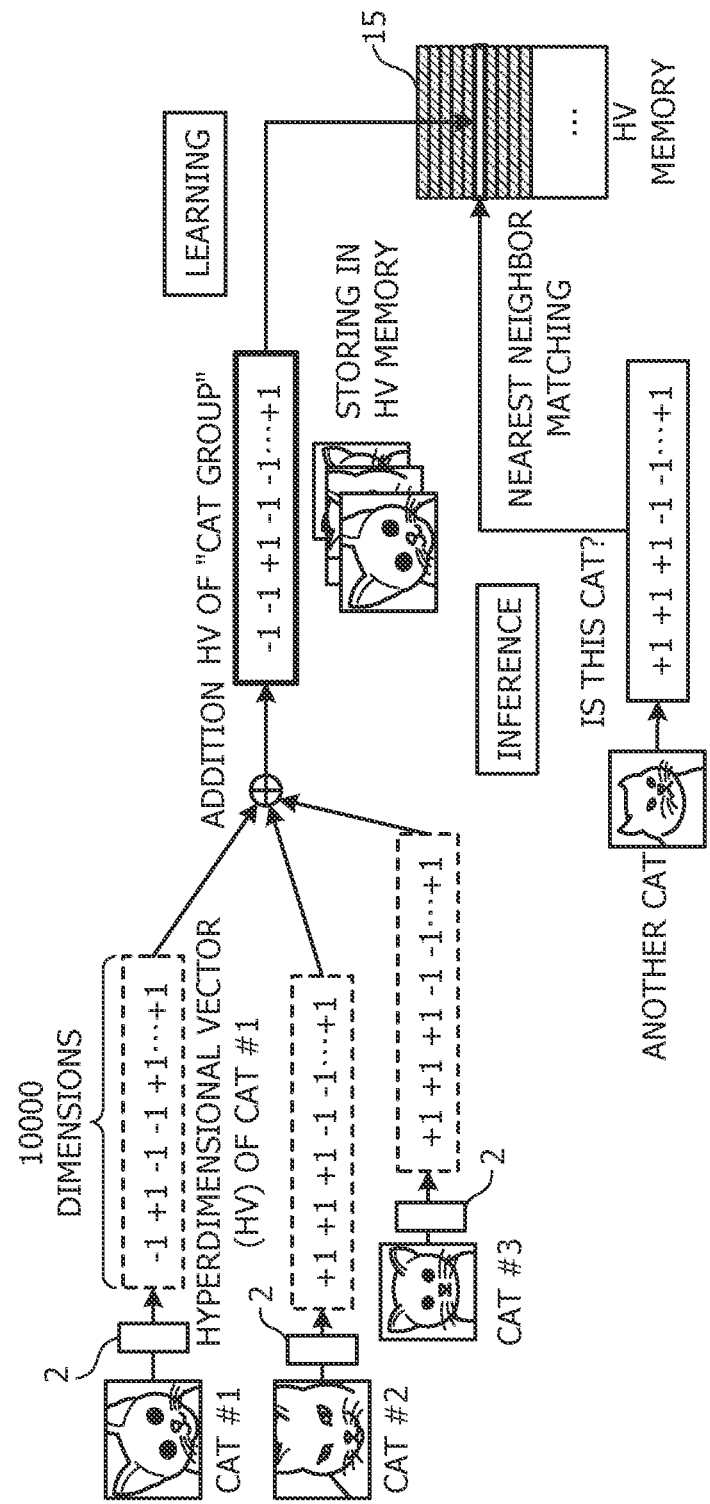
FIG. 3 is a diagram for explaining learning and inference in HDC.

FIG. 3 is a diagram for explaining learning and inference in the HDC. As illustrated in FIG. 3, in a learning phase, the HV encoders 2 generate the HV of the cat #1, the HV of the cat #2, and the HV of the cat #3 respectively from the image of the cat #1, the image of the cat #2, and the image of the cat #3. The HV of the cat #1, the HV of the cat #2, and the HV of the cat #3 are added to generate the HV of the "cat group", and the generated HV is stored in an HV memory 15 in correlation with the "cat group".

In an inference phase, an HV is generated from an image of another cat, the HV of the "cat group" is retrieved from the HV memory 15 as an HV that matches the generated HV through nearest neighbor matching, and a "cat" is output as the inference result. Here, the nearest neighbor matching is to calculate the degree of matching between HVs by using the dot product between the HVs and output a class with the highest degree of matching. When two HVs are $H_i$, $H_j$, a dot product $p = H_i \cdot H_j$ is D (the dimension of the HVs) in the case where $H_i$ and $H_j$ match, and −D in the case where $H_i$ and $H_j$ are orthogonal to each other. Since the HV memory 15 is a content addressable memory, the nearest neighbor matching is performed at high speed.

In an inference apparatus according to the embodiment, the HV is generated based on the features extracted by an NN instead of the HV encoders 2. With the inference apparatus according to the embodiment, extracting the features from the image, which is pattern processing, is performed by the NN, and storing the HV in the HV memory 15 and association by using the HV memory 15, which are symbolic processing, is performed by the HDC. In this way, by utilizing the advantageous characteristics of the NN and the HDC, the inference apparatus according to the embodiment may efficiently perform training and inference.

Figure 4:
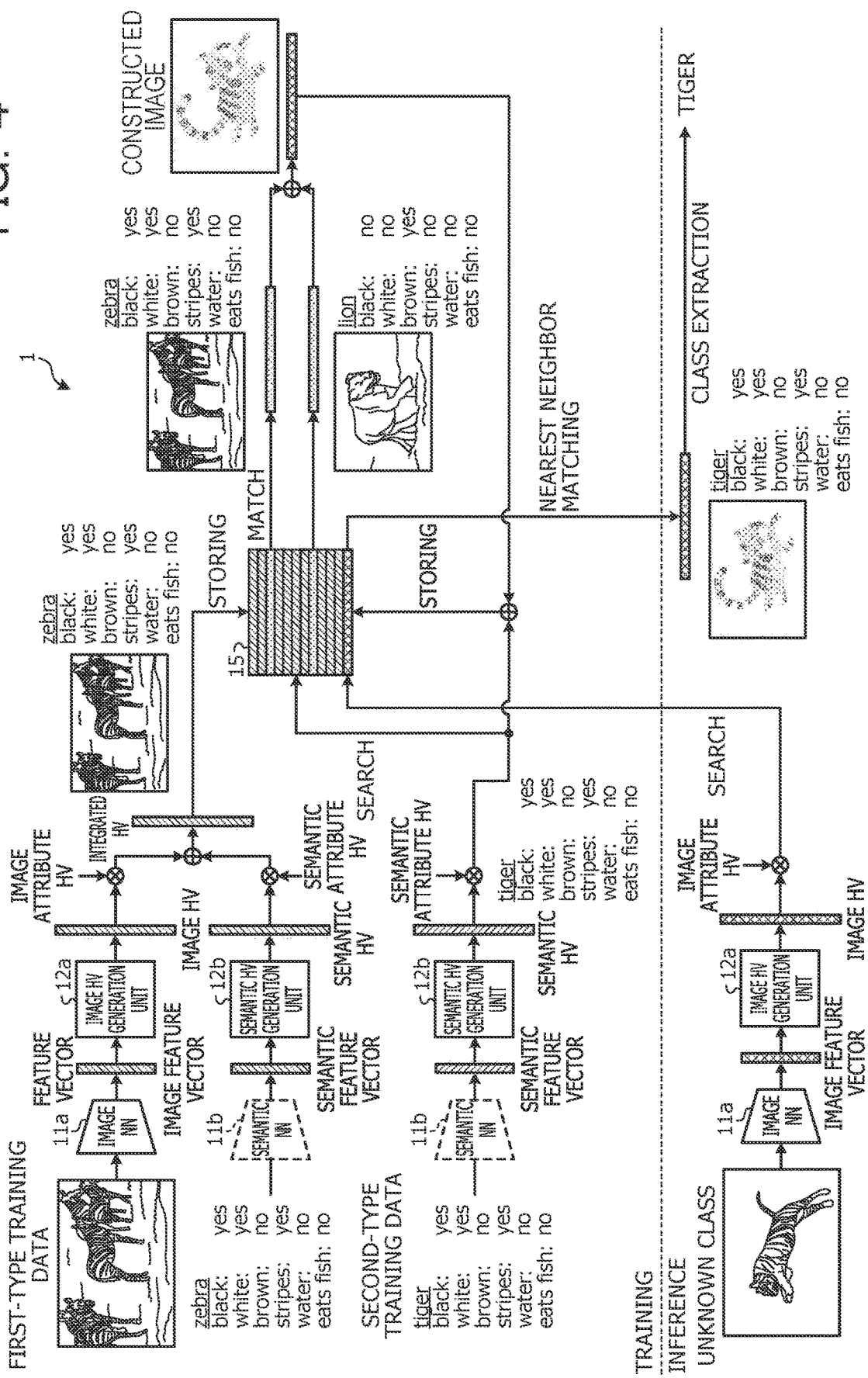
FIG. 4 is a diagram for explaining operation of an inference apparatus according to an embodiment.

Next, operation of the inference apparatus according to the embodiment will be described. FIG. 4 is a diagram for explaining operation of the inference apparatus according to the embodiment. As illustrated in FIG. 4, in training, an inference apparatus 1 according to the embodiment performs the training by using first-type training data and second-type training data.

Regarding the first-type training data, an image NN 11a receives image information and generates an image feature vector. An image HV generation unit 12a generates an image HV based on the image feature vector. Also, a semantic NN 11b receives semantic information and generates a semantic feature vector. When the semantic information represents a semantic feature, the inference apparatus 1 may generate a semantic feature vector from the semantic information without using the semantic NN 11b. A semantic HV generation unit 12b generates a semantic HV based on the semantic feature vector.

The inference apparatus 1 generates an image attribute space HV by multiplying the image HV by an image attribute HV and generates a semantic attribute space HV by multiplying the semantic HV by a semantic attribute HV. Here, the dimensions of the image attribute HV and the semantic attribute HV are the same as the dimensions of the image HV and the semantic HV.

The operation of multiplying an HV by an attribute HV is to map the HV to a subspace. For example, to multiply the image HV by the image attribute HV is to map the image HV to an image attribute subspace, and to multiply the semantic HV by the semantic attribute HV is to map the semantic HV to a semantic attribute subspace. In the inference apparatus 1, by multiplying HVs by the attribute HVs to map the HVs to the subspaces as described above, the individual HVs before integration are able to be separated from the other HVs in an integrated HV after integration.

The inference apparatus 1 generates the integrated HV by adding the image attribute space HV and the semantic attribute space HV. The inference apparatus 1 stores the integrated HV as knowledge data in the HV memory 15. The multiplication of two HVs is multiplication performed on an element-by-element basis.

In contrast, regarding the second-type training data, the semantic NN 11b receives the semantic information and generates the semantic feature vector. When the semantic information represents the semantic feature, the inference apparatus 1 may generate the semantic feature vector from the semantic information without using the semantic NN 11b. The semantic HV generation unit 12b generates the semantic HV based on the semantic feature vector.

The inference apparatus 1 generates the semantic attribute space HV by multiplying the semantic HV by the semantic attribute HV and searches in the HV memory 15 by using the semantic attribute space HV. The inference apparatus 1 obtains, from the HV memory 15, a predetermined number of integrated HVs selected from an integrated HV exhibiting the highest degree of matching with the semantic attribute space HV and generates the integrated HV representing a constructed image by adding the obtained predetermined number of integrated HVs. In FIG. 4, the predetermined number is two. The generated constructed image is a constructed image of a tiger. The inference apparatus 1 adds the integrated HV representing the constructed image and the semantic attribute space HV to store the result in the HV memory 15.

Since the inference apparatus 1 generates the integrated HV representing the constructed image by searching in the HV memory 15 and adding the integrated HVs as described above, the constructed image may be generated at high speed.

In the inference, the image NN 11a receives an image information of an animal of an unknown class and generates an image feature vector. The image HV generation unit 12a generates an image HV based on the image feature vector. The inference apparatus 1 generates an image attribute space HV by multiplying the image HV by the image attribute HV and searches in the HV memory 15 by using the image attribute space HV. The inference apparatus 1 extracts a class by using the nearest neighbor matching. In FIG. 4, a tiger is output as an inference result.

Figure 5:
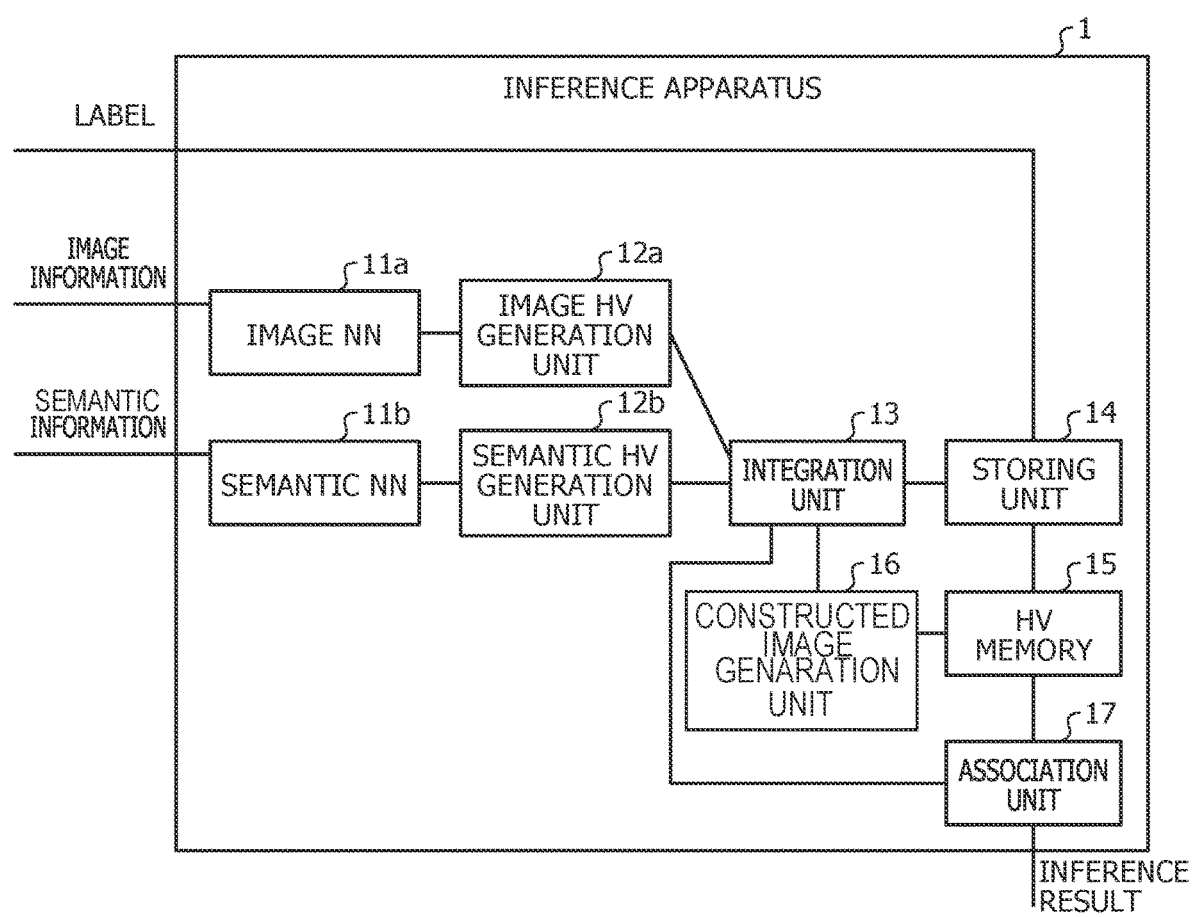
FIG. 5 illustrates a functional configuration of the inference apparatus.

Next, a functional configuration of the inference apparatus 1 will be described. FIG. 5 illustrates a functional configuration of the inference apparatus 1. As illustrated in FIG. 5, the inference apparatus 1 includes the image NN 11a, the semantic NN 11b, the image HV generation unit 12a, the semantic HV generation unit 12b, an integration unit 13, a storing unit 14, the HV memory 15, a constructed image generation unit 16, and an association unit 17.

The image NN 11a receives image information and outputs an image feature vector. The image feature vector is, for example, a vector of output values of nodes of the output layer of the image NN 11a. The image NN 11a receives image information of the first-type training data in the learning phase and image information of unknown data in the inference phase.

The semantic NN 11b receives semantic information and outputs a semantic feature vector. The semantic feature vector is, for example, a vector of output values of nodes of the output layer of the semantic NN 11b. The semantic NN 11b receives semantic information of the first-type training data and the second-type training data in the learning phase.

For implementation of the image NN 11a and the semantic NN 11b, for example, a graphics processing unit (GPU) and a processor dedicated to deep learning (DL) are used.

The image HV generation unit 12a generates an image HV based on the image feature vector. For example, when the image feature vector is x and the dimension of x is n, the image HV generation unit 12a centers x. For example, the image HV generation unit 12a calculates an average value vector of x by using expression (1) below and subtracts the average value vector of x from x as represented in expression (2). In expression (1), $D_{base}$ is a set of x, and $|D_{base}|$ is the size of the set of x.

$$\bar{x} = \frac{1}{|D_{base}|} \sum_{x \in Dbase} x \qquad (1)$$

$$x \leftarrow x - \bar{x} \qquad (2)$$

The image HV generation unit 12a normalizes x. For example, the image HV generation unit 12a divides x by an L2 norm of x as represented in expression (3) below. The image HV generation unit 12a is not necessarily perform the centering and the normalization.

$$x \leftarrow \frac{x}{\|x\|_2} \qquad (3)$$

The image HV generation unit 12a quantizes each element of x into Q steps to generate $q=\{q_1, q_2, \ldots, q_n\}$. The image HV generation unit 12a may perform linear quantization or logarithmic quantization.

The image HV generation unit 12a generates a base HV ($L_i$) represented in expression (4) below. In expression (4), D is the dimension of the HV, for example, 10000. The image HV generation unit 12a randomly generates $L_1$ and sequentially generates $L_2$ to $L_Q$ by flipping D/Q bits at random positions. $L_i$ and adjacent Li are near to each other, and $L_1$ and $L_Q$ are orthogonal to each other.

$$L=\{L_1, L_2, \ldots, L_Q\}, L_i \in \{-1,+1\}^D \qquad (4)$$

The image HV generation unit 12a generates a channel HV ($C_i$) represented in expression (5) below. The image HV generation unit 12a randomly generates $C_i$ such that all $C_i$ are substantially orthogonal.

$$C=\{C_1, C_2, \ldots, C_n\}, C_i \in \{-1,+1\}^D \qquad (5)$$

The image HV generation unit 12a calculates the it age HV by using the expression (6) below. In expression (6), "·" is a dot product.

$$HV = \text{sign}(L_{q1} \cdot C_1 + L_{q2} \cdot C_2 + \ldots + L_{qn} \cdot C_n) \in \{-1,+1\}^D \qquad (6)$$

The semantic HV generation unit 12b generates a semantic HV based on the semantic feature vector. The semantic HV generation unit 12b calculates the semantic HV by using the base HV and the channel HV in a similar manner to that of the image HV generation unit 12a with the semantic feature vector set as x.

Regarding the first-type training data, the integration unit 13 generates an image attribute space HV by multiplying the image HV by the image attribute HV and generates a semantic attribute space HV by multiplying the semantic HV by the semantic attribute HV. The integration unit 13 generates an integrated HV by adding the image attribute space HV and the semantic attribute space HV. The integration unit 13 passes the integrated HV to the storing unit 14.

Regarding the second-type training data, the integration unit 13 generates a semantic attribute space HV as an integrated HV by multiplying the semantic HV by the semantic attribute HV. The integration unit 13 passes the integrated HV to the constructed image generation unit 16.

Regarding the first-type training data, the storing unit 14 stores the integrated HV generated by the integration unit 13 in the HV memory 15 in correlation with a class.

The HV memory 15 stores therein the integrated HV in correlation with the class. For example, the HV memory 15 stores therein the integrated HV at an address related to the class. Alternatively, the HV memory 15 stores therein the class and the integrated HV in correlation with each other. The HV memory 15 is a content addressable memory. The speed and density of the HV memory 15 may be increased by using a resistive random-access memory (ReRAM), a memristor, or the like.

Regarding the second-type training data, the constructed image generation unit 16 searches in the HV memory 15 by using the integrated HV generated by the integration unit 13. The constructed image generation unit 16 obtains, from the HV memory 15, a predetermined number of integrated HVs selected from an integrated HV exhibiting the highest degree of matching with the integrated HV generated by the integration unit 13 and generates an integrated HV representing a constructed image by adding the obtained predetermined number of integrated HVs. The constructed image generation unit 16 adds the integrated HV representing the constructed image and the integrated HV generated by the integration unit 13 and stores the result in the HV memory 15.

In the inference phase, the association unit 17 outputs, as an inference result, a class associated by the HV memory 15 from the integrated HV generated by the integration unit 13. For example, the association unit 17 outputs a class corresponding to an integrated HV exhibiting the highest degree of matching with the integrated HV generated by the integration unit 13. The association unit 17 performs matching between the integrated HV and HVs stored in the HV memory 15 at high speed.

Figure 6:
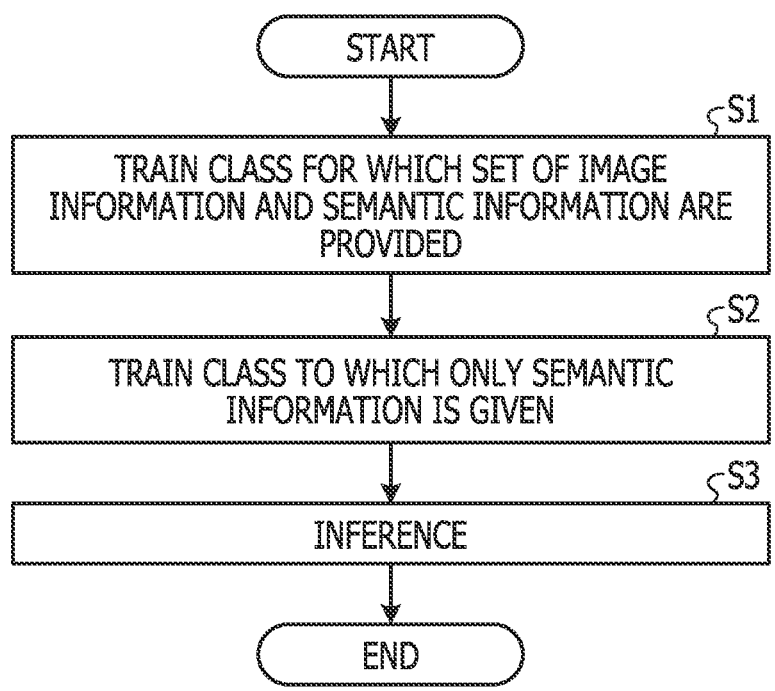
FIG. 6 is a flowchart illustrating a flow of processing performed by the inference apparatus.

Next, a flow of processing performed by the inference apparatus 1 is described with reference to FIGS. 6 to 9. FIG. 6 is a flowchart illustrating a flow of processing performed by the inference apparatus 1. As illustrated in FIG. 6, the inference apparatus 1 performs first training, that is, training of a class for which a set of image information and semantic information are provided (step S1). Then, the inference apparatus 1 performs second training, that is, training of a class to which only semantic information is given (step S2). Then, the inference apparatus 1 receives image information, the class of which is unknown, to perform inference (step S3) and outputs a class as an inference result.

Figure 7:
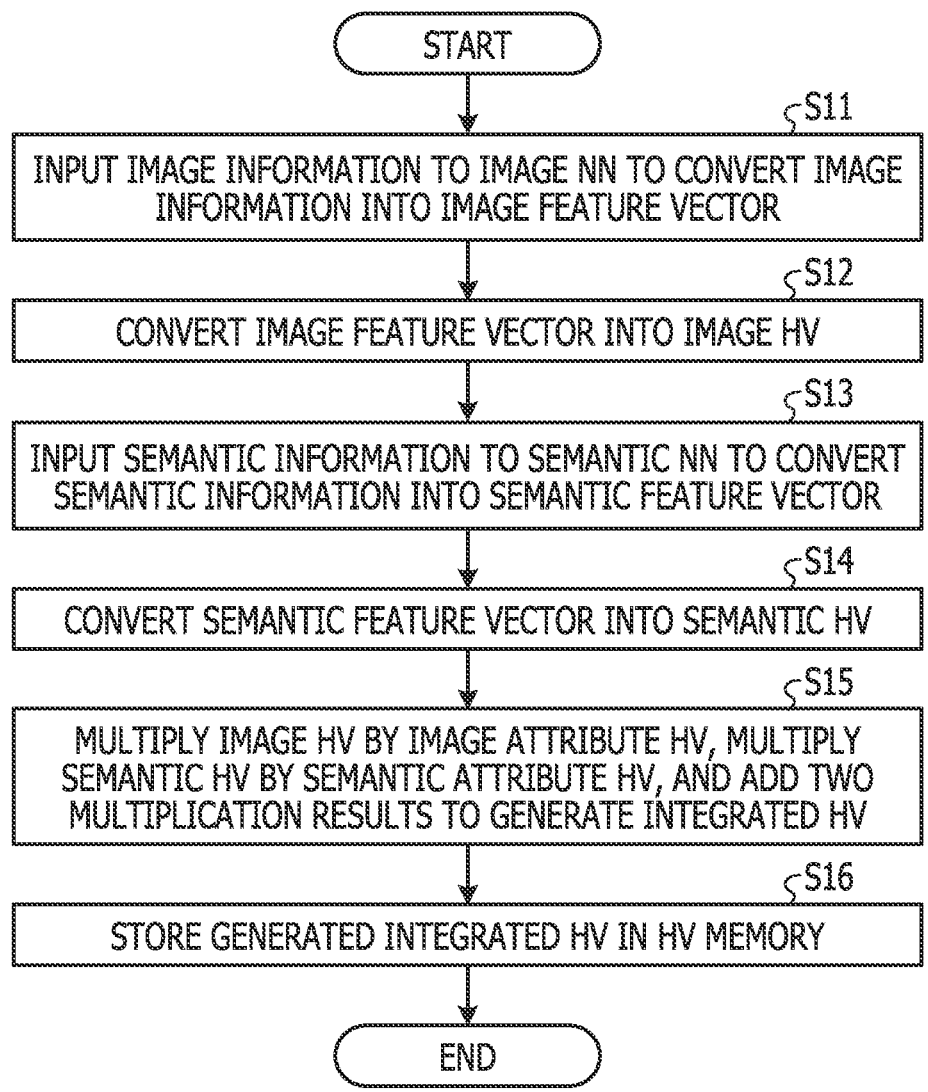
FIG. 7 is a flowchart illustrating a flow of processing of first training.

FIG. 7 is a flowchart illustrating a flow of processing of the first training. As illustrated in FIG. 7, the inference apparatus 1 inputs image information to the image NN 11a to convert the image information into an image feature vector (step S11). The inference apparatus 1 converts the image feature vector into an image HV (step S12). The inference apparatus 1 inputs semantic information to the semantic NN 11b to convert the semantic information into a semantic feature vector (step S13). The inference apparatus 1 converts the semantic feature vector into a semantic HV (step S14).

The inference apparatus 1 may perform the processing of steps S13 and S14 before the processing of steps S11 and S12. Alternatively, the inference apparatus 1 may perform the processing of steps S13 and S14 in parallel with the processing of steps S11 and S12.

The inference apparatus 1 multiplies the image HV by an image attribute HV, multiplies the semantic HV by a semantic attribute HV, and add the results of the two additions to generate an integrated HV (step S15). The inference apparatus 1 stores in the HV memory 15 the generated integrated HV (step S16).

Since the inference apparatus 1 generates the integrated HV based on the image HV and the semantic HV and stores in the HV memory 15 the generated integrated HV as described above, the inference apparatus 1 is able to store the knowledge data in the HV memory 15.

Figure 8:
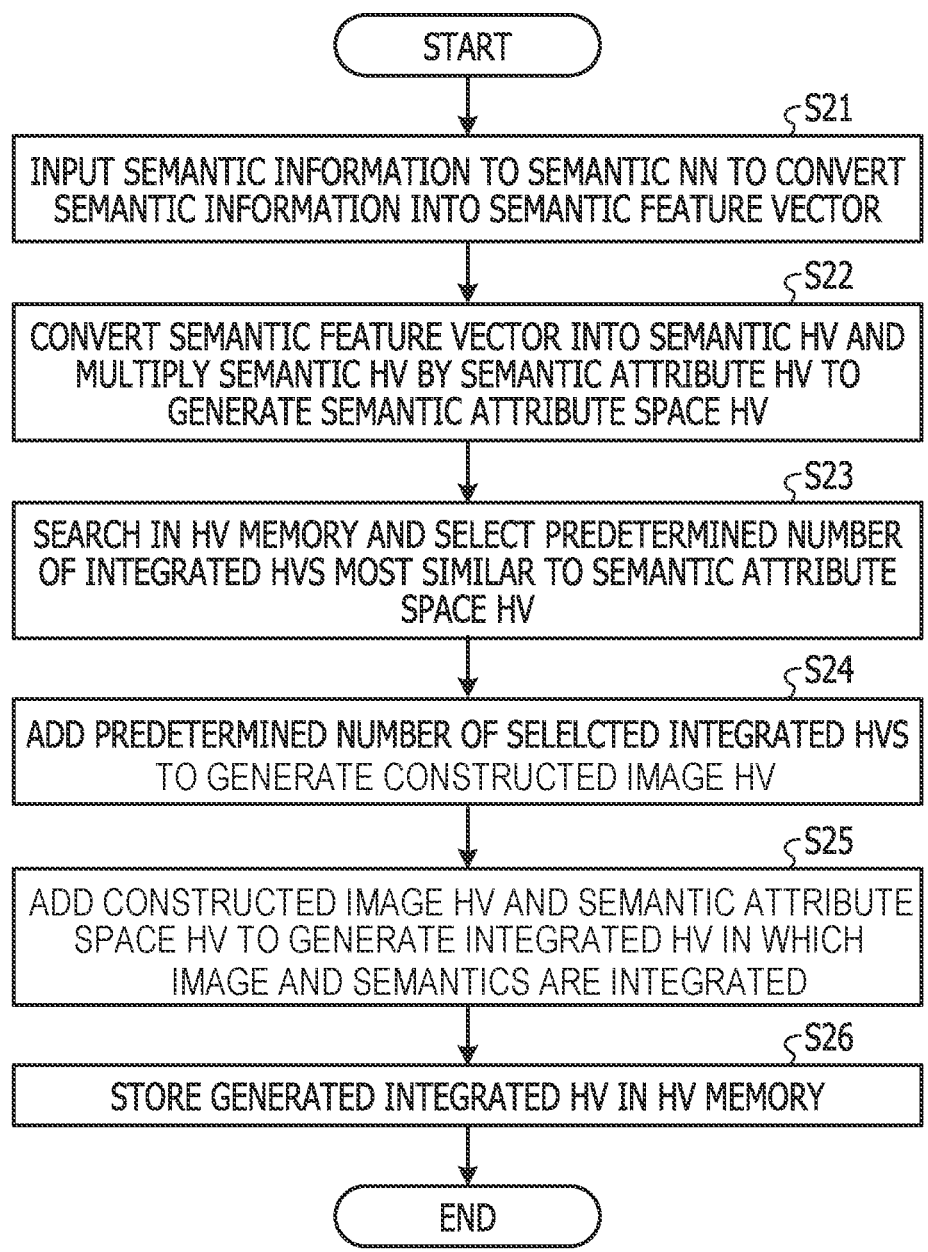
FIG. 8 is a flowchart illustrating a flow of processing of a second training.

FIG. 8 is a flowchart illustrating a flow of processing of the second training. As illustrated in FIG. 8, the inference apparatus 1 inputs semantic information to the semantic NN 11b to convert the semantic information into a semantic feature vector (step S21). The inference apparatus 1 converts the semantic feature vector into a semantic HV and multiplies the semantic HV by the semantic attribute HV to generate a semantic attribute space HV (step S22). The inference apparatus 1 searches in the HV memory 15 to select a predetermined number of integrated HVs most similar to the semantic attribute space HV (step S23).

The inference apparatus 1 adds the predetermined number of selected integrated HVs to generate a constructed image HV (step S24). The inference apparatus 1 adds the constructed image HV and the semantic attribute space HV to generate an integrated HV in which image and semantics are integrated (step S25). The inference apparatus 1 stores in the HV memory 15 the generated integrated HV (step S26).

As described above, the inference apparatus 1 generates a constructed image HV based on a predetermined number of integrated HVs selected from the HV memory 15. Thus, the inference apparatus 1 is able to identify a class from image information even for an object for which image information is absent in the training data.

Figure 9:
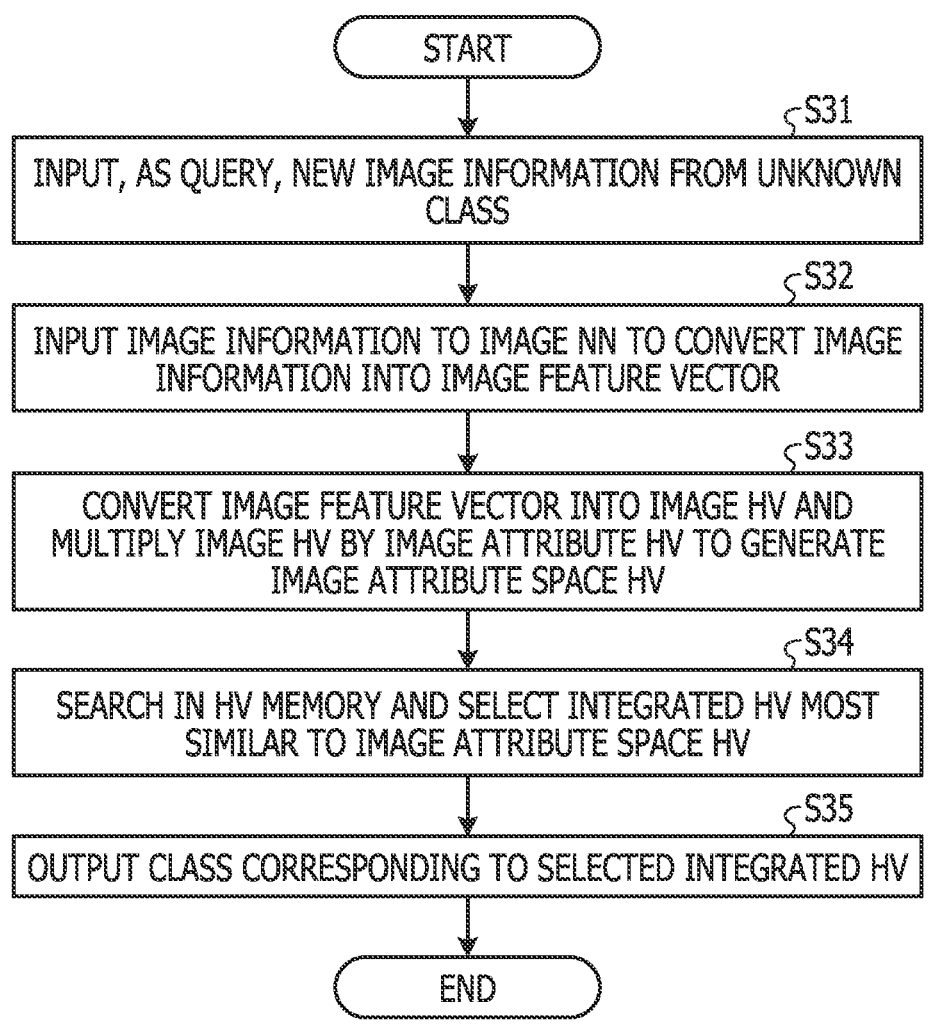
FIG. 9 is a flowchart illustrating a flow of an inference process.

FIG. 9 is a flowchart illustrating a flow of an inference process. As illustrated in FIG. 9, the inference apparatus 1 inputs, as a query, new image information from an unknown class (step S31). The inference apparatus 1 inputs the image information to the image NN 11a to convert the image information into an image feature vector (step S32). The inference apparatus 1 converts the image feature vector into an image HV and multiplies the image HV by the image attribute HV to generate an image attribute space HV (step S33).

The inference apparatus 1 searches in the HV memory 15 and selects an integrated HV most similar to the image attribute space HV (step S34). The inference apparatus 1 outputs a class corresponding to the selected integrated HV (step S35).

As described above, the inference apparatus 1 searches in the HV memory 15 in which the constructed image HV is included. Thus, the inference apparatus 1 is able to identify a class even for an object for which image information is not included in the training data.

The inference apparatus 1 may use the semantic information after conversion by utilizing a word database, a commonsense database, or the like. Examples of the conversion include Word2Vec and Numberbatch. The Word2Vec converts a word into a vector representation. In the Word2Vec, a semantic relationship between words is included in the vector representation. The Numberbatch uses the commonsense database ConceptNet to convert a word into a vector representation. The Numberbatch may allow wider representation of the semantic relationship between words. When the semantic information is converted by utilizing the Word2Vec, the Numberbatch or the like, the dimensions of the semantic feature vector may be increased.

Figure 10:
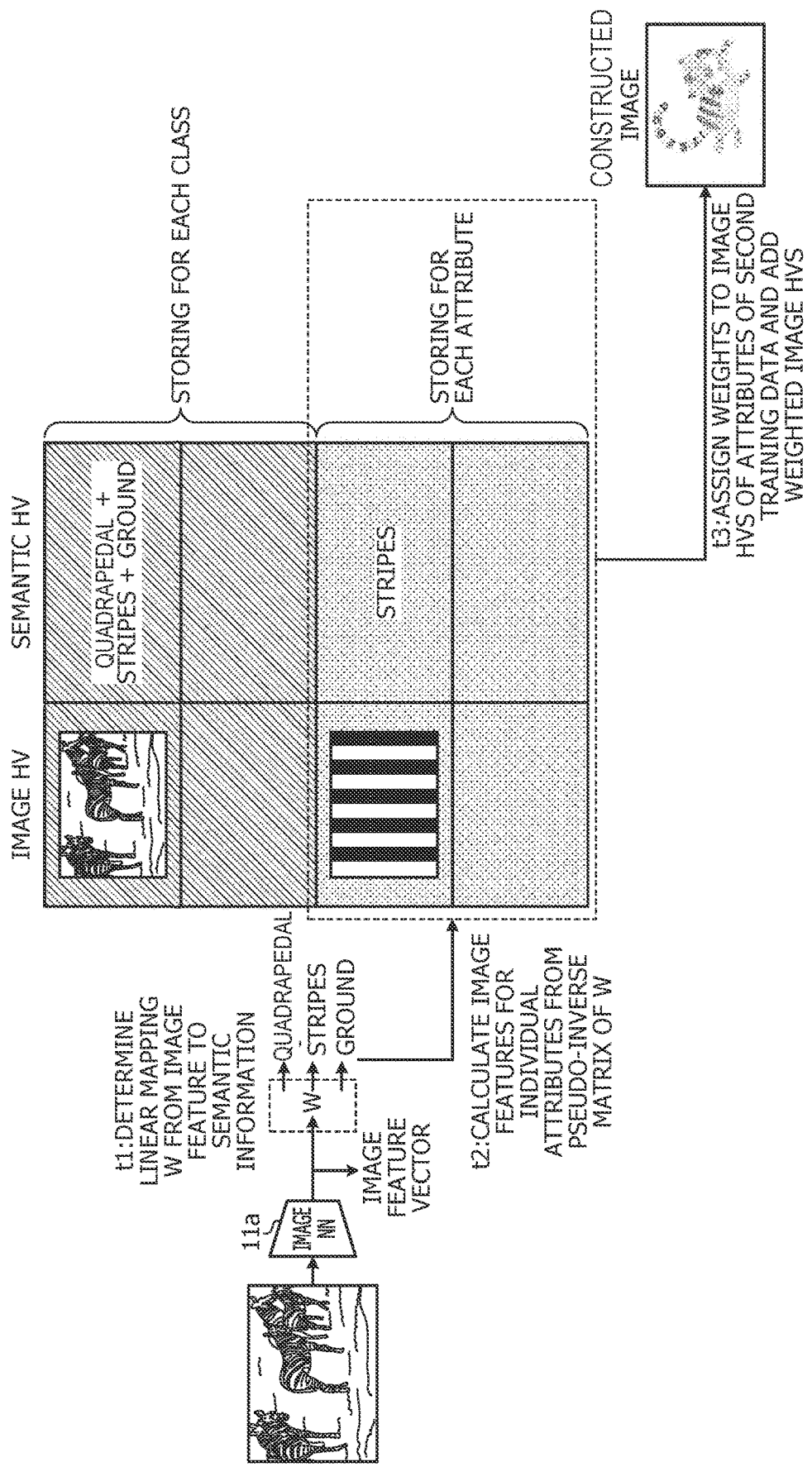
FIG. 10 is a diagram for explaining decomposition of an image feature for individual attributes included in semantic information.

When the inference apparatus 1 generates the constructed image, instead of searching in the HV memory 15 and adding the predetermined number of integrated HVs of a high degree of matching, the inference apparatus 1 may decompose the image feature for individual attributes included in the semantic information, and then, perform the addition. FIG. 10 is a diagram for explaining decomposition of the image feature for individual attributes included in the semantic information. As illustrated in FIG. 10, the inference apparatus 1 generates a constructed image of "zebra" from, for example, an integrated HV of "stripes", an integrated HV of a "quadrapedal", an integrated HV of a "ground", and the like.

Although FIG. 10 illustrates an image in which a constructed image is generated by using image features of respective attributes, the inference apparatus 1 actually generates a constructed image by matrix calculation. For example, when an image feature matrix of the first-type training data is a matrix F of $n_{cis}$ rows and $n_{vis}$ columns, a mapping matrix from the image features to attributes is a matrix W of $n_{vis}$ rows and $n_{att}$ columns, and an attribute matrix of the first-type training data is a matrix A of $n_{cis}$ rows and $n_{att}$ columns, FW=A, where $n_{cis}$ is the number of classes, $n_{vis}$ is the number of image features, and $n_{att}$ is the number of attributes.

The inference apparatus 1 determines linear mapping W from image features to the semantic information (t1). For example, the inference apparatus 1 calculates W in accordance with $W=F^+A$, where $F^+$ is a pseudo-inverse matrix of F. The inference apparatus 1 calculates a pseudo-inverse matrix $W^+$ of W. The inference apparatus 1 calculates image features for individual attributes from $W^+$ (t2). For example, the inference apparatus 1 generates a constructed image F' corresponding to an attribute A' in accordance with $F'=A'W^+$. The inference apparatus 1 assigns weights to image HVs of attributes of the second training data and adds the weighted image HVs (t3), thereby generating a constructed image. The inference apparatus 1 may directly calculate the $W^+$ in accordance with $W^+=A^+F$.

As described above, according to the embodiment, regarding the first-type training data, the image HV generation unit 12a generates an image HV based on an image feature vector, and the semantic HV generation unit 12b generates a semantic HV based on a semantic feature vector. The integration unit 13 generates an integrated HV based on the image HV and the semantic HV, and the storing unit 14 stores the integrated HV in the HV memory 15. Regarding the second-type training data, the semantic HV generation unit 12b generates a semantic HV based on a semantic feature vector, and the integration unit 13 generates an integrated HV based on the semantic HV. The constructed image generation unit 16 searches in the HV memory 15 by using the integrated HV, obtains, from the HV memory 15, a predetermined number of integrated HVs selected from an integrated HV exhibiting the highest degree of matching with the integrated HV generated by the integration unit 13, and generates an integrated HV representing a constructed image by adding the obtained predetermined number of integrated HVs. The constructed image generation unit 16 adds the integrated HV representing the constructed image and the integrated HV generated by the integration unit 13 and stores the result in the HV memory 15. Thus, the inference apparatus 1 may generate the constructed image in a short time. As a result of comparison with the existing method by using several data sets, the inference apparatus 1 realized accuracy equivalent to that of the existing method.

According to the embodiment, regarding image information of an unknown class, the image HV generation unit 12a generates an image HV based on an image feature vector, and the integration unit 13 generates an integrated HV based on the image HV. The association unit 17 searches in the HV memory 15 that stores therein integrated HVs including integrated HVs representing constructed images, and outputs, as an inference result, a class related to an integrated HV exhibiting the highest degree of matching with the integrated HV generated by the integration unit 13. Thus, the inference apparatus 1 is able to infer a class from image information even when image information is not given by training.

According to the embodiment, since the image NN 11a receives image information and generates an image feature vector, the inference apparatus 1 may efficiently generate the image feature vector.

According to the embodiment, the integration unit 13 multiplies an image HV and an image attribute HV and multiplies a semantic HV and a semantic attribute HV. Two multiplication results are added to generate an integrated HV. Thus, the inference apparatus 1 is able to separate individual HVs before integration from other HVs in the integrated HV.

According to the embodiment, the inference apparatus 1 identifies a mapping matrix from an image feature to a semantic information, generates a constructed image for each attribute included in the semantic information by using a pseudo-inverse matrix of the identified mapping matrix, and generates an image hyperdimensional vector from the constructed image for each attribute. Thus, the inference apparatus 1 may generate a more accurate constructed image.

Although the inference apparatus 1 has been described according to the embodiment, an inference program having similar functions may be obtained by implementing the configuration of the inference apparatus 1 with software. A computer (information processing apparatus) that executes the inference program will be described.

Figure 11:
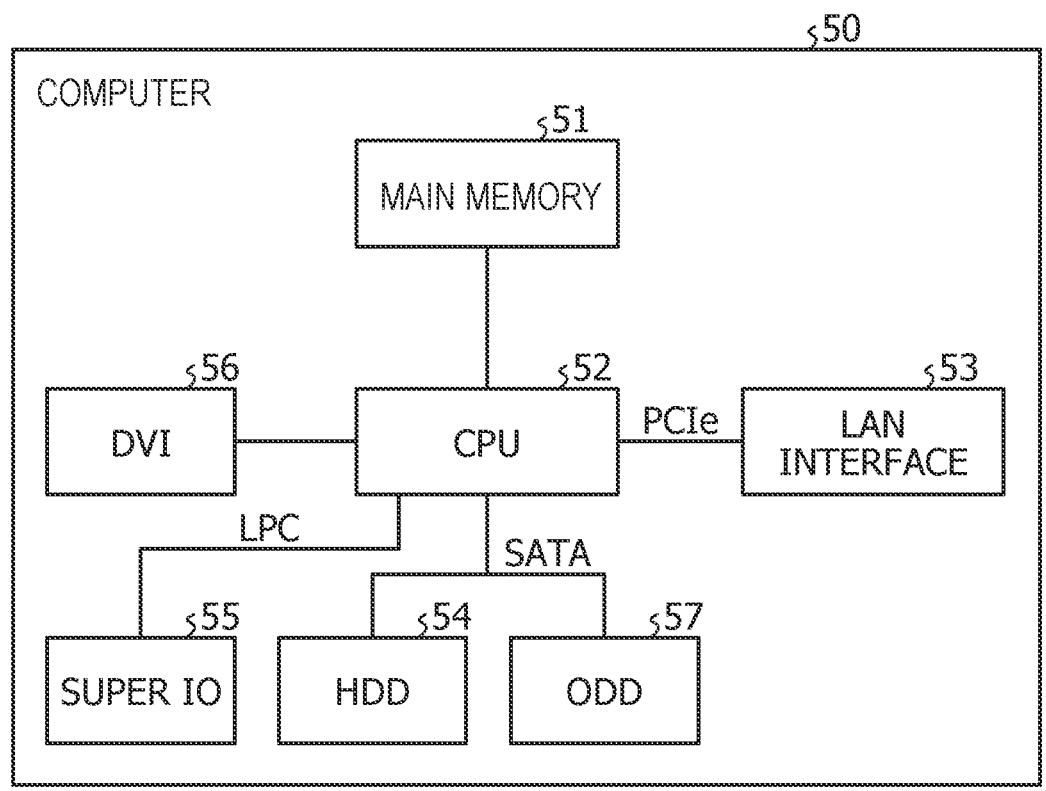
FIG. 11 illustrates a hardware configuration of a computer that executes an inference program according to the embodiment.
Figure 12B:
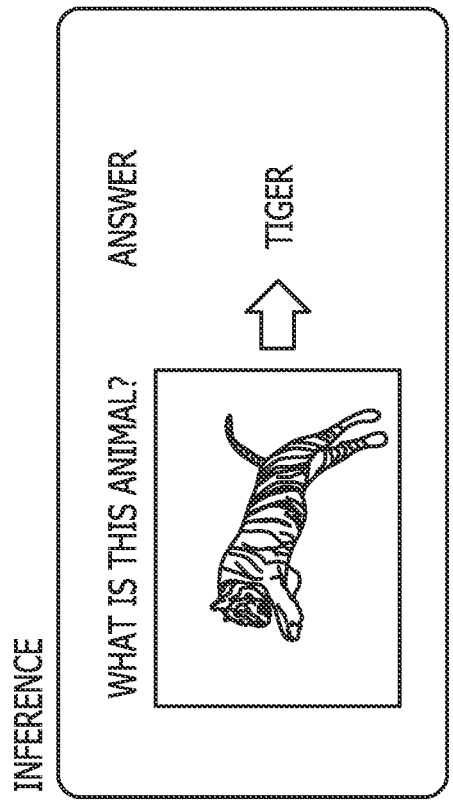
FIGS. 12A and 12B are diagrams for explaining zero-shot learning.
Figure 12A:
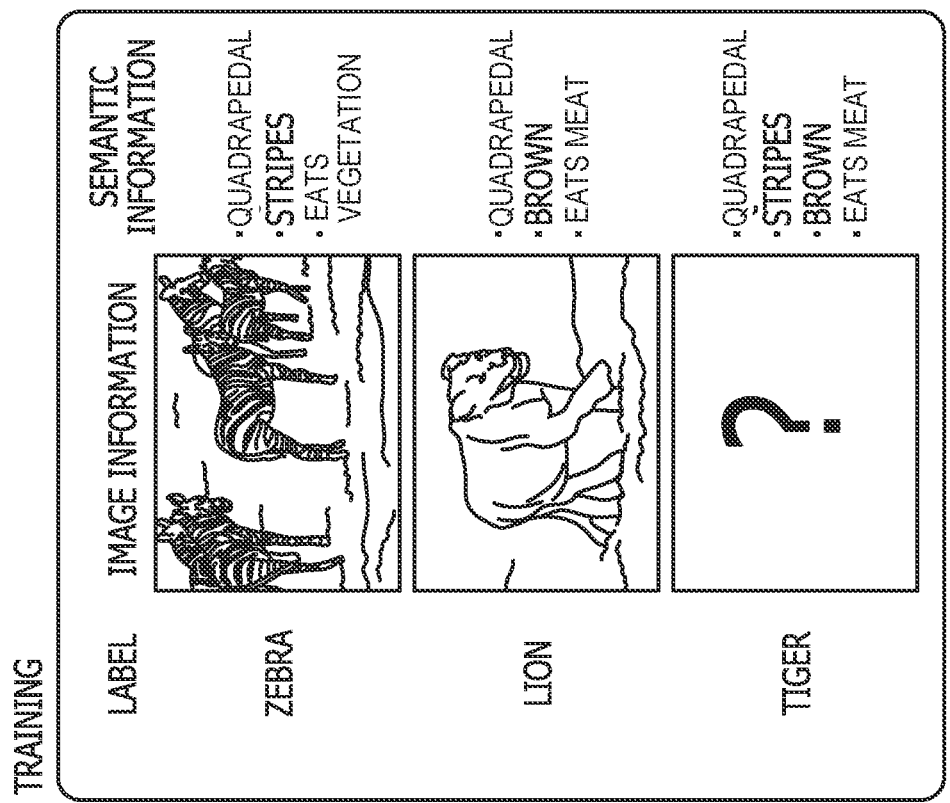

FIG. 11 illustrates a hardware configuration of the computer that executes the inference program according to the embodiment. As illustrated in FIG. 11, a computer 50 includes a main memory 51, a central processing unit (CPU) 52, a local area network (LAN) interface 53, and a hard disk drive (HDD) 54. The computer 50 also includes a super input/output (IO) 55, a digital visual interface (DVI) 56, and an optical disk drive (ODD) 57.

The main memory 51 is a memory that stores programs, intermediate execution results of the programs, and the like. The CPU 52 is a processor that reads the programs from the main memory 51 and executes the programs. The CPU 52 includes a chipset that includes a memory controller.

The LAN interface 53 is an interface for coupling the computer 50 to another computer via a LAN. The HDD 54 is a disk device that stores therein programs and data, and the super IO 55 is an interface for coupling input devices such as a mouse and a keyboard. The DVI 56 is an interface for coupling a display device such as a liquid crystal display device, and the ODD 57 is a device for reading from or writing to an optical recording medium such as a Digital Versatile Disc (DVD).

The LAN interface 53 is coupled to the CPU 52 by, for example, a Peripheral Component Interconnect Express (PCIe), The HDD 54 and the ODD 57 are coupled to the CPU 52 by, for example, a Serial Advanced Technology Attachment (SATA). The super IO 55 is coupled to the CPU 52 by, for example, a low pin count (LPC).

The inference program to be executed by the computer 50 is stored in the DVD as an example of a recording medium readable by the computer 50, read from the DVD by the ODD 57, and installed in the computer 50. Alternatively, the inference program is stored in a database or the like of another computer system coupled through the LAN interface 53, read from the database or the like, and installed in the computer 50. The installed inference program is stored in the HDD 54, loaded to the main memory 51, and executed by the CPU 52.

Although the case where the image information and the semantic information are used has been described according to the embodiment, the inference apparatus may use another type of information such as sound information instead of the image information.

In the one aspect, the present disclosure may generate the constructed image in a short time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an inference program for causing a computer to execute a process, the process comprising:

for each of plural pieces of first-type training data of first objects to be learned, the first-type training data including first image information, first semantic information, and a first class of a relevant first object,
generating a first image hyperdimensional vector (HV) from the first image information,
generating a first semantic HV from the first semantic information,
generating a first integrated HV by integrating the first image HV and the first semantic HV, and
storing the first integrated HV in a storage unit in correlation with the first class; and for each of plural pieces of second-type training data of second objects to be learned, the second-type training data including second semantic information and a second class of a relevant second object and not including image information of the relevant second object, generating a second semantic HV from the second semantic information, searching in the storage unit based on the second semantic HV, obtaining, from the storage unit, a predetermined number of integrated HVs selected from an integrated HV exhibiting a highest degree of matching with the second semantic HV, generating a second integrated HV of the second-type training data based on the predetermined number of integrated HVs, and storing the second integrated HV in the storage unit in correlation with the second class, the generating the first integrated HV by integrating the first image HV and the first semantic HV includes:

generating an image attribute space vector by multiplying the first image HV by an image attribute HV, generating a semantic attribute space vector by multiplying the first semantic HV by a semantic attribute HV, and generating the first integrated HV based on the image attribute space vector and the semantic attribute space vector.

2. The non-transitory computer-readable recording medium according to claim 1, the process further comprising:

generating a second image HV from second image information of an object to be identified; and searching in the storage unit based on the second image HV to obtain a class correlated to one of the integrated HVs stored in the storage unit, which exhibits a highest degree of matching with the second image HV.

3. The non-transitory computer-readable recording medium according to claim 1, wherein the generating the first image HV from the first image information includes:

extracting an image feature, which indicates a feature of the first image information, by using a neural network, and generating the first image HV based on the extracted image feature, and the generating the first semantic HV from the first semantic information includes:

extracting a semantic feature, which indicates a feature of the semantic information, by using the neural network, and generating the first semantic HV based on the extracted semantic feature.

4. The non-transitory computer-readable recording medium according to claim 1, wherein the generating the first image HV from the first image information includes:

extracting an image feature, which indicates a feature of the first image information, by using a neural network, identifying a mapping matrix from the extracted image feature to the first semantic information, generating constructed images for respective attributes included in the first semantic information by using a pseudo-inverse matrix of the identified mapping matrix, and generating the first image HV based on the constructed images generated for the respective attributes.

5. A method of inferring, the method comprising:

for each of plural pieces of first-type training data of first objects to be learned, the first-type training data including first image information, first semantic information, and a first class of a relevant first object, generating, by a computer, a first image hyperdimensional vector (HV) from the first image information, generating a first semantic HV from the first semantic information, generating a first integrated HV by integrating the first image HV and the first semantic HV, and storing the first integrated HV in a storage unit in correlation with the first class; and for each of plural pieces of second-type training data of second objects to be learned, the second-type training data including second semantic information and a second class of a relevant second object and not including image information of the relevant second object, generating a second semantic HV from the second semantic information, searching in the storage unit based on the second semantic HV, obtaining, from the storage unit, a predetermined number of integrated HVs selected from an integrated HV exhibiting a highest degree of matching with the second semantic HV, generating a second integrated HV of the second-type training data based on the predetermined number of integrated HVs, and storing the second integrated HV in the storage unit in correlation with the second class, the generating the first integrated HV by integrating the first image HV and the first semantic HV includes:

generating an image attribute space vector by multiplying the first image HV by an image attribute HV, generating a semantic attribute space vector by multiplying the first semantic HV by a semantic attribute HV, and generating the first integrated HV based on the image attribute space vector and the semantic attribute space vector.

6. An information processing apparatus, comprising:

a memory; and a processor coupled to the memory and the processor configured to:

for each of plural pieces of first-type training data of first objects to be learned, the first-type training data including first image information, first semantic information, and a first class of a relevant first object, generate, by a computer, a first image hyperdimensional vector (HV) from the first image information, generate a first semantic HV from the first semantic information, generate a first integrated HV by integrating the first image HV and the first semantic HV, and store the first integrated HV in the memory in correlation with the first class; and for each of plural pieces of second-type training data of second objects to be learned, the second-type training data including second semantic information and a second class of a relevant second object and not including image information of the relevant second object, generate a second semantic HV from the second semantic information, search in the memory based on the second semantic HV, obtain, from the memory, a predetermined number of integrated HVs selected from an integrated HV exhibiting a highest degree of matching with the second semantic HV, generate a second integrated HV of the second-type training data based on the predetermined number of integrated HVs, and store the second integrated HV in the memory in correlation with the second class, the generating the first integrated HV by integrating the first image HV and the first semantic HV includes:

generating an image attribute space vector by multiplying the first image HV by an image attribute HV, generating a semantic attribute space vector by multiplying the first semantic HV by a semantic attribute HV, and generating the first integrated HV based on the image attribute space vector and the semantic attribute space vector.

* * * * *